United States Patent [19]
Foster

[11] Patent Number: 4,704,949
[45] Date of Patent: Nov. 10, 1987

[54] PISTON

[75] Inventor: John D. Foster, Benbrook, Tex.
[73] Assignees: Robert Ogg, Zanesville, Ohio; John H. Mulholland, Monroe, Conn.; part interest to each

[21] Appl. No.: 513,812
[22] Filed: Jul. 15, 1983
[51] Int. Cl.[4] ..... F16J 1/02
[52] U.S. Cl. ..... 92/160; 92/178
[58] Field of Search ..... 92/178, 160; 308/6 R, 308/6 B; 123/193 P, 193 CP

[56] References Cited

U.S. PATENT DOCUMENTS 2,328,439 8/1943 Pelterie ..... 62/403 X
2,695,824 11/1954 Klingel, Jr. ..... 92/160
3,327,593 6/1967 Ciaccia ..... 92/178
3,398,653 8/1968 Foster ..... 92/178

*Primary Examiner*—Edward K. Look
*Attorney, Agent, or Firm*—John H. Mulholland

[57] ABSTRACT

This application relates to a piston having two sets of three roller bearings mounted by means of milled grooves in a lightweight skirt of less diameter than the piston head. Each triangularly arranged set of roller bearings is symmetrically arranged to give a rolling three point stability and rolling anti-friction support to the piston as it reciprocates in the cylinder. Lubrication of the roller bearings is enhanced by openings through the piston skirt in the area of the oil rings above the roller bearings. The roller bearing axles are mounted in milled grooves.

8 Claims, 4 Drawing Figures

PISTON

BACKGROUND OF THE INVENTION

This invention relates to anti-friction pistons and is an improvement over the piston disclosed in U.S. Pat. No. 3,398,653 issued to the same inventor on Aug. 27, 1968. The pistons of both the earlier patent and instant invention include roller bearings each bearing including multiple rollers 30*a* mounted on an axle in the piston skirt so that friction may be reduced between the piston and a cylinder in which it reciprocates.

BRIEF DESCRIPTION OF THE INVENTION

The present invention provides the advantages of the piston of U.S. Pat. No. 3,398,653 and further permits a reduction of piston cost and piston weight and an attendant reduction of energy expenditure to drive the piston in a cylinder. The foregoing improvements over the piston of U.S. Pat. No. 3,398,653 are accomplished by the reduction of the required number of roller bearings and the triangular arrangement of the bearings in openings in the piston skirt.

In addition, the provision of a reduced diameter skirt which is lighter and stronger permits the utilization of lighter connecting rods and wrist pins. An additional feature of the improved piston is the provision of lubricating openings aligned over the roller bearings in the oil ring groove to distribute oil in the path of travel of the roller bearings.

A further significant advantage of the invention is a simplified mounting of the roller bearings on their respective axles in grooves made in the piston skirt by numerically controlled ball end mills. The use of a milling machine eliminates expensive drill jigs and problems of drill "walk" on the cylindrical piston skirt which heretofore had been encountered in providing the drilled axle holes. It also eliminates the need of a different jig for each piston size. By setting up the new piston in an indexing head of a milling machine, the ball end mill tool produces extremely accurate grooves in the piston skirt, each perpendicular to a radius of the piston and opening radially outwardly. A cavity or opening is cut or otherwise provided intermediate the length of each of said grooves in communication therewith to receive a roller bearing. The axles of the bearings rest in the accurately milled outwardly open grooves, the ends of which may be staked to secure the roller bearings in place for ease of assembly of the piston in a cylinder.

Three point stability of the piston in a cylinder is provided by triangular areas formed by two upper roller bearings and one lower roller bearing equidistant from each of said two upper bearings. Two triangular areas are provided in symmetrical arrangement opposite each other in the piston skirt equidistant from the piston's wrist pin openings with the upper bearings above the centerline of the wrist pin and the lower bearings below the centerline of the wrist pin.

BRIEF DESCRIPTION OF THE DRAWINGS

Throughout the drawings, like parts are provided like reference numerals.

DESCRIPTION OF THE PREFERRED EMBODIMENT

Figure 2:
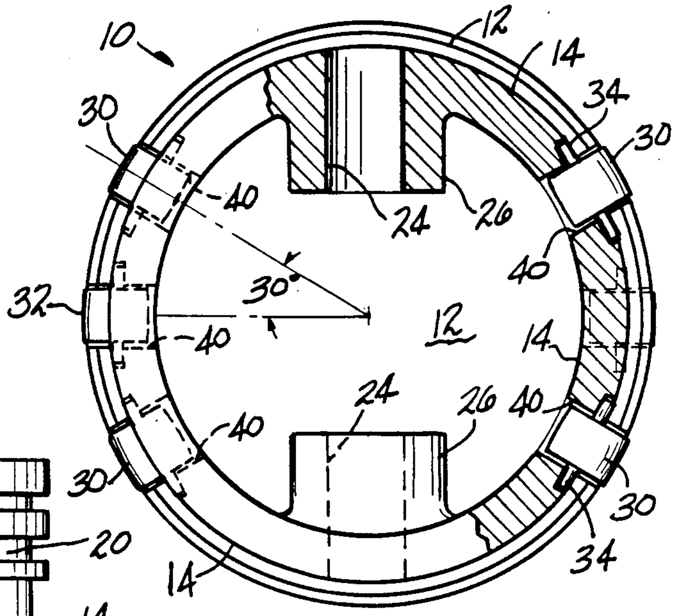
FIG. 2 is a schematic bottom plan view of the piston of FIG. 1 with portions of the skirt broken away for illustrative purposes.
Figure 1:
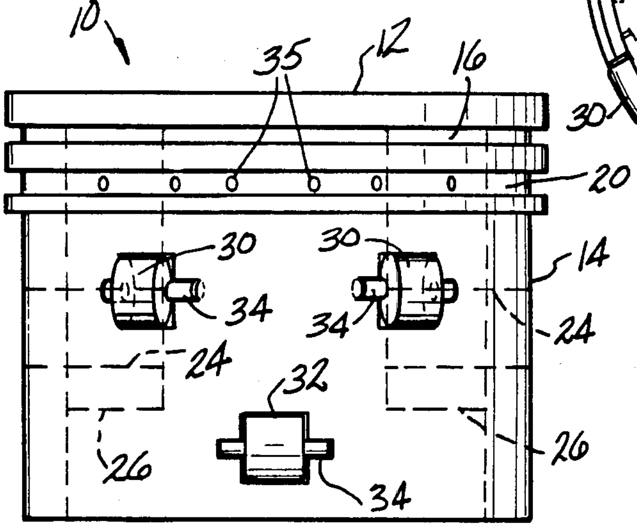
FIG. 1 is a front elevational view of the piston of the invention.
Figure 4:
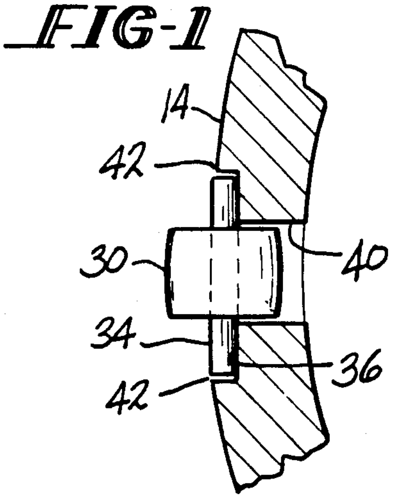
FIG. 4 is an enlarged schematic portion of FIG. 2 illustrating pertinent detail of the roller bearing mounting in a milled groove.

The numeral 10 generally designates the novel anti-friction piston of the invention. The piston 10 includes a head 12 of circular cross-section and a skirt 14 of a diameter less than the diameter of head 12. Adjacent the top of the piston 10 is a groove 16 for a compression ring 18, and below that, a groove 20 for an oil ring 22. The skirt 14 has wrist pin openings 24 located on opposite sides thereof which pass through bosses 26 on the inside of skirt 14.

On the piston skirt 14, six roller bearings 30 having multiple rollers 30*a* of the type described in U.S. Pat. No. 3,398,653 are arranged to form two areas of three point stability symmetrically oriented equidistant from wrist pin openings 24. The triangular areas are each formed of two upper roller bearings 30 and one lower roller bearing 32 equidistant from each of the two upper bearings 30 with which it is associated.

The roller bearings 30 and 32 are rotationally mounted on axles 34 which, in turn, rest in milled grooves 36. Intermediate the ends of grooves 36 are openings or cavities 40 in the skirt 14 to accommodate the rollers 30 and 32. The ends 42 of grooves 36 may be staked against the axles 34 to secure the roller bearings in place for ease of assembly of the piston in a cylinder. The cylinder may be in an internal combustion engine, a compressor or the like.

The three point stability of the piston is provided in the illustrated embodiment by means of the four upper roller bearings 32 being located 30° on either side of a perpendicular bisector of the wrist pin opening center line and the lower roller bearings being in a vertical plane including the perpendicular bisector of the wrist pin opening center line. The center line lies vertically between the upper and lower roller bearings.

Figure 3:
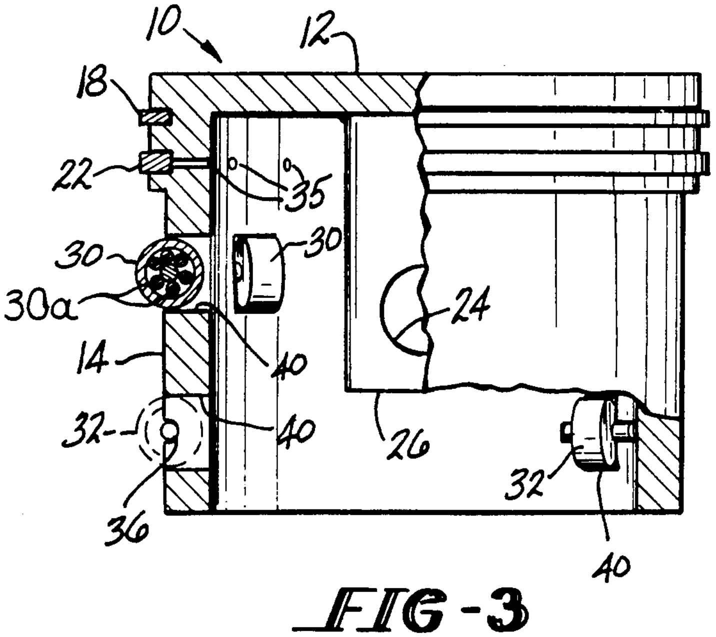
FIG. 3 is a schematic elevational view of the piston of FIGS. 1 and 2 with portions broken away and portions cut of angular position for illustrative purposes.

The position of the roller bearings 30 and 32 in the piston skirt 14 as shown in FIG. 2 is accurate but in FIG. 3 the roller bearings 30 and 32 are shown schematically and are out of position for illustrative purposes.

The oil ring groove 20 has pairs of lubricating openings 35, through which lubricating oil may flow, communicating the groove 20 with the interior of the piston. The pairs of openings 35 are aligned over the roller bearings 30 and 32 to distribute oil in the path of travel of the roller bearings.

The above description should not limit the scope of protection of this invention. The claims below set forth the bounds of the invention.

I claim:

1. An improved anti-friction piston for reciprocation in a cylinder comprising:

a head of circular cross section;

a skirt attached to said head;

a plurality of roller bearings, each bearing including multiple rollers mounted on an axle individually set in a separate straight groove in said skirt;

each of said grooves extending substantially perpendicular to a radius of said piston and opening radially outwardly;

a cavity in said skirt intermediate the length of each of said grooves in communication therewith and with the piston interior to receive a roller bearing therein;

said roller bearing grooves and cavities being arranged in a pair of symmetrically opposed triangles to provide the skirt with areas of three point stability within said cylinder.

2. The piston of claim 1 in which the skirt is of a diameter less than the diameter of the circular cross-section of the head.

3. The piston or claim 1 in which the opposed triangles are formed of two upper roller bearings and one lower roller bearing equidistant from each of said two upper bearings.

4. The piston of claim 1 in which the skirt includes bosses with wrist pin openings and the symmetrically opposed triangles are located in the skirt equidistant from the wrist pin openings.

5. The piston of claim 4 in which the centers of the wrist pin openings are located vertically between the upper roller bearings and the lower roller bearings.

6. The piston of claim 1 which includes an oil ring groove and lubricating openings through which lubricating oil may flow communicating said oil ring groove with the interior of said piston and each of said roller bearings.

7. The piston of claim 6 in which the lubricating openings are aligned substantially over the roller bearings to distribute oil to said roller bearings.

8. The piston of claim 1 in which the grooves are staked at their ends to secure the roller bearings in place for ease of assembly of the piston in a cylinder.

* * * * *